June 8, 1926.
J. S. HARRIS
RESILIENT WHEEL
Filed June 16, 1924
1,587,726
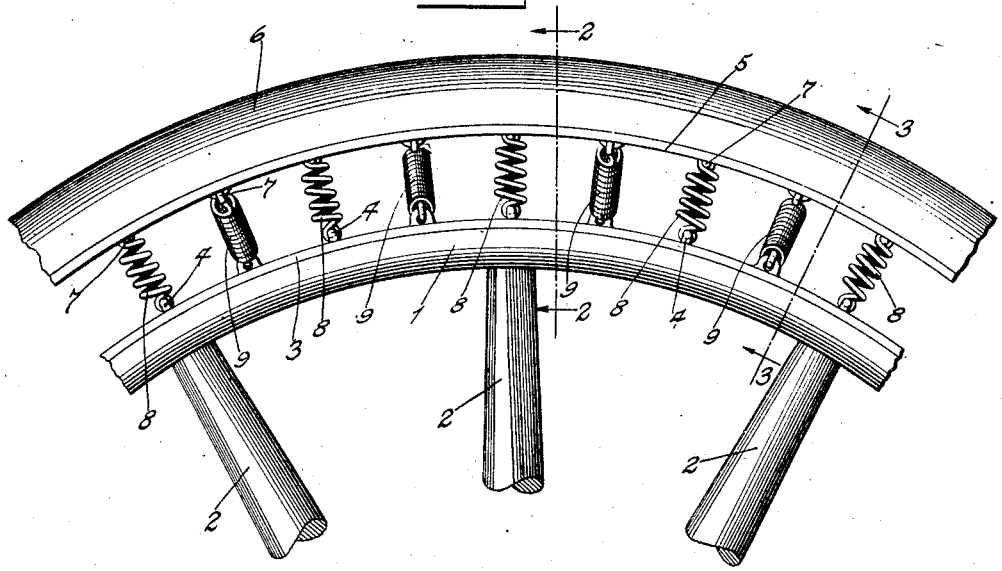
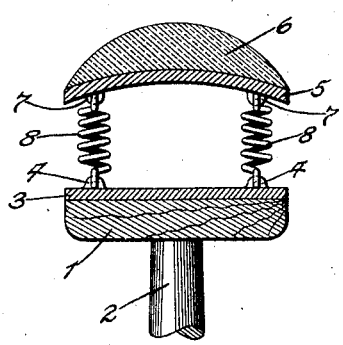
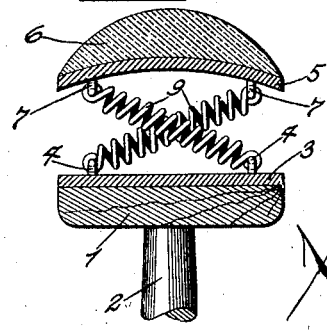
Inventor:
John S. Harris Patented June 8, 1926.

1,587,726

UNITED STATES PATENT OFFICE.

JOHN S. HARRIS, OF ST. LOUIS, MISSOURI.

RESILIENT WHEEL.

Application filed June 16, 1924. Serial No. 720,220.

This invention relates to resilient wheels.

An object of the invention is to provide an improved resilient wheel including an inner rim in rigid connection with the spokes of the wheel, and a tire ring member resiliently suspended from said inner rim by radial and by angularly disposed series of springs.

Other objects will appear from the following description, reference being made to the drawing in which—

Fig. 1 is a side elevation of a portion of the wheel made in accordance with the present invention.

Fig. 2 is a cross sectional view on the line 2—2 of Fig. 1.

Fig. 3 is a cross sectional view on the line 3—3 of Fig. 1.

As shown the felly 1 is rigidly attached to the ends of the wheel spokes 2 and is encircled by a metallic rim 3 of the full width of the felly 1 and having near each side edge thereof a row of eyelets 4.

The tire ring member comprises a metallic ring 5 preferably arcuate in cross section and encircled by a tire tread 6 of elastic material such as rubber, or other proper substance or composition. The thread 6 is secured in connection with the ring 5 by vulcanization and the cross sectional configuration of said ring assists in retaining the ring and the tread in proper relationship.

Near each side edge and on the inner side of the ring 5 is a row of eyelets 7 equal in number to the eyelets 4, the alternate eyelets 7 and 4 being in radial alinement. The alternate eyelets 4 at each side of the ring 3 are connected with the corresponding radially alined eyelets 7 on the ring 5 by radial coiled springs 8, which serve to suspend the inner wheel structure from the ring 5 while the tread 6 operates upon the surface of the ground or road. Between each pair of springs 8 angularly disposed springs 9 have their inner ends connected with the eyelets 4 and their outer ends connected with the eyelets 7. The adjacent springs 9 are inclined in opposite directions as will be readily understood by reference to Fig. 3, where it will be seen that the spring 9 connected to the eyelet 4 near one side edge of the ring 3 crosses the plane of the spring 9 that is connected with the eyelet 4 near the other side edge of the ring 3, and so on. The springs 9 serve to retain the tire member, comprising the ring 5 and the tread 6, from lateral displacement and they also assist the springs 8 in suspending the inner wheel structure from said tire portion.

The number of springs of each series may be varied as desired as may be their dimensions in order to obtain the desired results in wheels of different sizes and applied to different purposes.

I claim:

1. A wheel comprising a metallic felly member, a row of eyelets inwardly from each side edge of said member, an outer tire ring member of the full width of the felly member encircling and spaced from the felly member, a row of eyelets on the inside and inwardly from each side edge of said tire ring member, two series of radial coiled springs connecting eyelets on said tire ring member with corresponding eyelets on said felly member and having their outer sides throughout their length spaced inwardly from the planes of the side edges of said felly and tire ring members and protected thereby, and series of inclined springs having their inner ends connected to eyelets on said felly member in annular alinement with the eyelets to which said radial springs are connected and their outer ends connected to eyelets near the opposite side edge of said tire ring member in annular alinement with the eyelets to which said radial springs are connected and being throughout their length within the space between the planes of the side edges of said felly and tire ring members.

2. A wheel comprising a metallic felly member, a row of eyelets inwardly from each side edge of said member, an outer tire ring member of the full width of the felly member encircling and spaced from the felly member, a row of eyelets on the inside and inwardly from each side edge of said tire ring member, two series of radial coiled springs connecting eyelets on said tire ring member with corresponding eyelets on said felly member and having their outer sides throughout their length spaced inwardly from the planes of the side edges of said felly and tire ring members and protected thereby, and series of inclined springs having their inner ends connected to eyelets on said felly member in annular alinement with the eyelets to which said radial springs are connected and their outer ends connected to eyelets near the opposite side edge of said tire ring member in annular alinement with the eyelets to which said radial springs are connected and being throughout their length within the space between the planes of the side edges of said felly and tire ring members, one series of said last-named series of springs being inclined in one direction and another series of said last-named series being inclined in the opposite direction.

JOHN S. HARRIS.